RECEIVING DEVICE FOR TWO TELEVISION PROGRAMS

Filed Nov. 5, 1954 2 Sheets-Sheet 1

INVENTOR
LOUIS LE BLAN
BY Fred M. Vogel
AGENT

Sept. 6, 1960 L. LE BLAN 2,951,904

RECEIVING DEVICE FOR TWO TELEVISION PROGRAMS

Filed Nov. 5, 1954 2 Sheets-Sheet 2

INVENTOR
LOUIS LE BLAN
BY Fred M. Vogel
AGENT

United States Patent Office 2,951,904

Patented Sept. 6, 1960

2,951,904

RECEIVING DEVICE FOR TWO TELEVISION PROGRAMS

Louis Le Blan, Paris, France, assignor, by mesne assignments, to North American Philips Company, Inc., New York, N.Y., a corporation of Delaware Filed Nov. 5, 1954, Ser. No. 467,080

Claims priority, application France Jan. 6, 1954

6 Claims. (Cl. 179—15)

The present invention relates to a receiving apparatus for two television signals, of which one modulates the amplitude of the positive half-cycle periods of an auxiliary carrier and the other modulates the amplitude of the negative half-cycle periods of this wave, as described in United States Patent No. 2,877,290, which issued on March 10, 1959.

The invention has for its object to provide particularly simple means for separating the television signals which are transmitted simultaneously and correspond to the programs.

The object of the invention is to provide a novel demodulator system for a modulated wave of the foregoing type whereby the intelligence signal modulating the positive half periods of the auxiliary carrier wave and the signal modulating the negative half periods may be recovered in a simple positive manner by circuits substantially independent.

Figure 1:
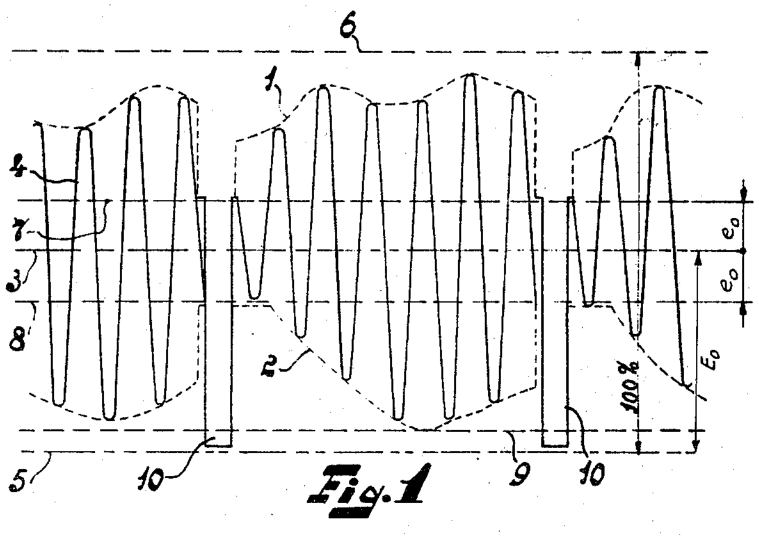
Figures 5, 6:
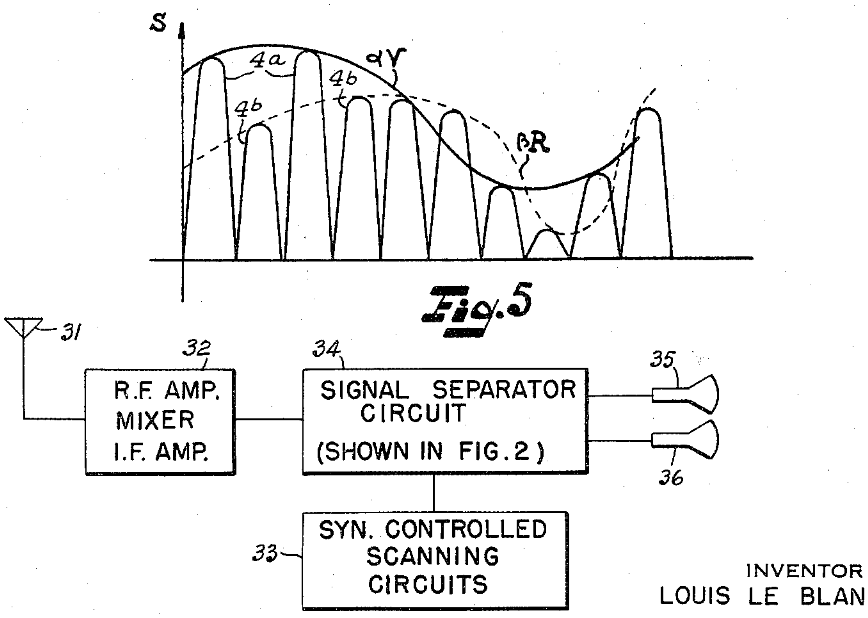
Figure 2:
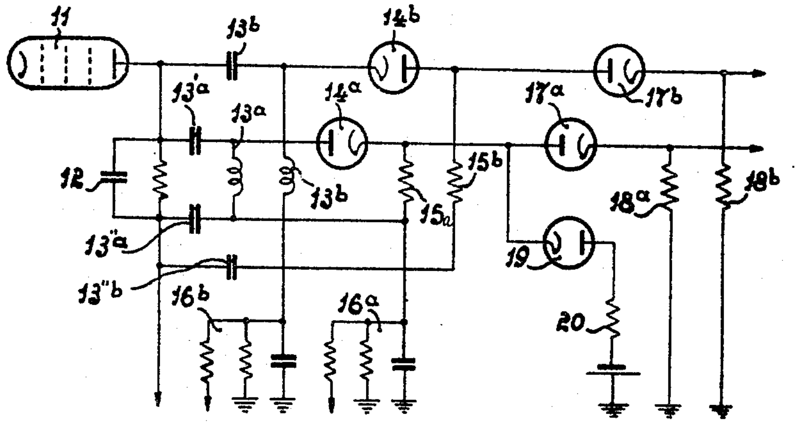
Figure 3:
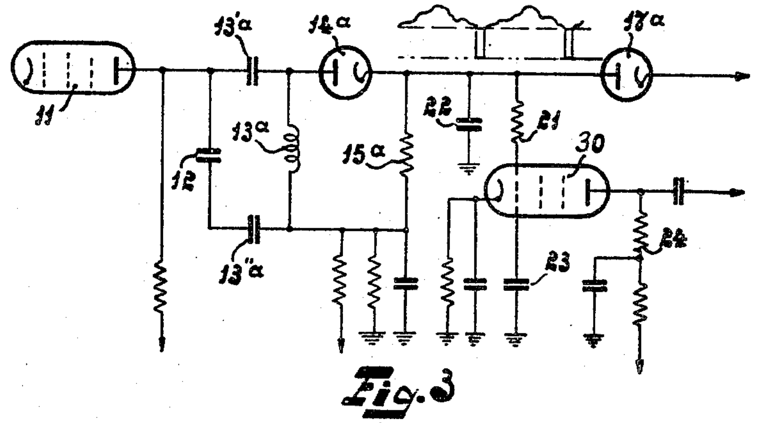

The invention will be described more fully with reference to the accompanying drawing, in which Fig. 1 shows such an auxiliary carrier with unequal half periods for the transmission of two television programs, Fig. 2 shows a diagram of the receiving apparatus according to the invention, Figs. 3 annd 4 shows embodiments for separating the synchronizing signals and Fig. 5 shows the positions of the signals corresponding to two colour components.

Fig. 6 is a block diagram showing a complete television receiver in accordance with the invention.

Referring to Fig. 1, the curve 1 denotes the complex video signal of the first television program, which is termed the "external" program, whereas the curve 2 denotes the complex video signal of the second, so-called "internal" program. The horizontal straight line 3 determintes the position of the auxiliary carrier 4 relative to the axis 5 of the main carrier. The maximum amplitudes of the non-modulated main carrier lie on the horizontal straight line 6, which also determines the maximum white level of the external program, whereas the horizontal straight line 7 determines the position of the black level. From this figure it is evident that for the internal program the black level corresponds to the ordinate of the straight line 8, whereas the maximum white level corresponds to the ordinate of the straight line 9, which is parallel to and near the axis 5. The pulses 10 of the said carrier correspond to the synchronizing pulses. In a variant (not shown) the straight lines 7 and 8 could be interchanged with the axis 3.

Referring to Fig. 2, reference numeral 11 designates the high-frequency stage or the intermediate-frequency stage immediately preceding the demodulator stage. The resonant circuit, included in the anode circuit of the stage 11, is constituted by a capacitor 12 of low capacity and an inductor, constituted by two identical coils **13*a* and 13*b*, which are connected in parallel for high-frequency currents and which may be obtained for example by simultaneously winding two relatively insulated wound wires. These two coils are connected to the capacitor 12 through the capacitors 13′*a* and 13″*a* and 13′*b*, 13″*b* respectively, these capacitors having a sufficient capacity to be considered as high-frequency connections without interruptions. Owing to this method of connecting the coils 13*a* and 13*b* are relatively decoupled. Consequently, they can feed two relatively independent circuits and/or receive signals having different polarities independently of one another. The coil 13*a* feeds the diode 14*a*, which supplies the positive parts of the video signals corresponding to the external modulation, whereas the coil 13*b* feeds the diode 14*b*, which supplies the negative parts of the video signals corresponding to the internal modulation. The diodes 14*a* and 14*b* are provided with load resistors 15*a* and 15*b*, respectively. In order to ensure correct operation of the apparatus, the diode 17*a* is polarized by a fixed voltage, which, corresponds to the ordinate $E_0$ of the straight line 3 relative to the straight line 5 of Fig. 1, if the black levels of both signals coincide with the axis 3 so that lines 7 and 8 coincide with the line 3 by means of a potentiometer 16*a*, which is suitably decoupled; in the same manner the diode 17*b* is polarized by a fixed voltage ($E_0$) by means of a second potentiometer 16*b*, which is identical with the aforesaid potentiometer. In this case the diode 17*a* supplies to the load resistor 18*a* the signals corresponding to the external modulation and the diode 17*b* supplies to a further load resistor 18*b*** the signals corresponding to the internal modulation.

If the auxiliary carrier is modulated as is indicated in Fig. 1, i.e. if the black levels of the two programs or of the two colour components do not coincide with the axis of the carrier, the polarizing bias of the diodes **17*a* and 17*b*** are changed accordingly.

If by $E_0$ is designated the ordinate of the axis 3 relative to the axis 5 annd if $\pm e_0$ designates the ordinates of the levels 7 and 8 relative to the aixs 3, the diode **17*a* is polarized by a potential $-E_0-e_0$ and the diode 17*b*** is polarized by a potential $+E_0-e_0$.

If the synchronizing pulses correspond to the instantaneous suppression of the main carrier (with positive modulation) the conventional methods for separation are applied. In the device shown in Fig. 2 the diode 19, having a suitable polarity, permits the reception of the signals through the resistor 20. They may also be separated by means of known devices, which are shown in Fig. 3. This device comprises a pentode 30, which is connected to the circuit **14*a*—17*a* for the transmission of the external program through the resistor 21, which is decoupled by the capacitors 22 and 23. The pentode 30 operates in the anode characteristic curve; the resistor 21 is chosen to be such that the components of the image signals are suppressed by the grid current. The pulses thus separated and occurring at 24 are obtained with suitable polarity and are limited in the amplitude by applying a comparatively low voltage to the screen and the anode of the pentode 30**.

Figure 4:
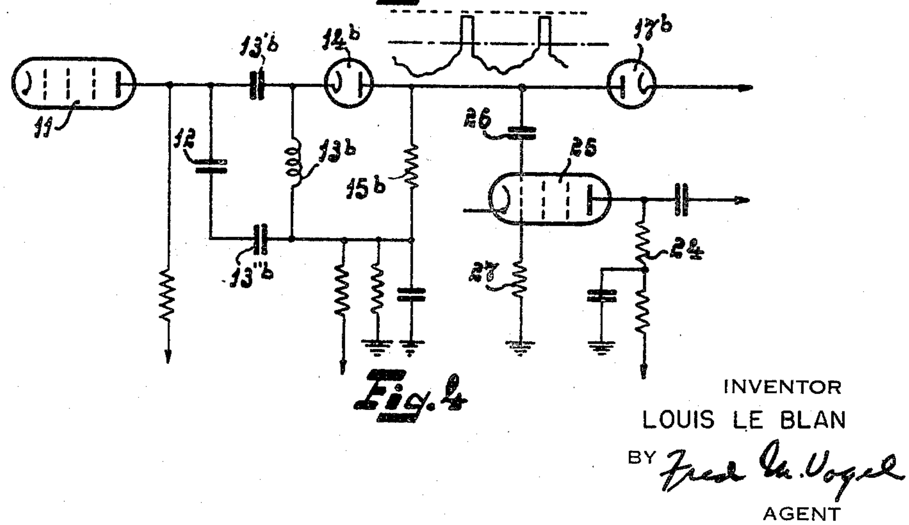

If for example the synchronizing pulses correspond to the instantaneous suppression of the main carrier (with negative modulation) they may be separated by known means, which are shown in Fig. 4. This device comprises a pentode 25, which produces the separation by means of the grid resistor. As in the first-mentioned case (Fig. 3) the screen voltage and the anode voltage must be low. The time constant of the RC-circuit of the capacitor 26 and the resistor 27 must also be low (about a fraction of a second).

It is of importance to note that the synchronizing pulses may, as an alternative, be separated subsequent to the demodulation of the main carrier, but prior to the separation of the two image signals or colour signals, i.e. immediately from the complex signals shown in Fig. 1.

An example of the use of such a device according to the invention is given by colour television. If for example the external modulations lie in a range of the modulation percentage of the main carrier and correspond to the green components and if the internal modulation lies within a range of the modulation percentage of the main carrier and corresponds to the red components, the receiver comprises, in accordance with the invention, the required members to perform the following operations. After the first detection of the main carrier, the positive half periods of the auxiliary carrier (or the positive sampling pulses) with the external modulation $\alpha V$ are transmitted, preferably without alterations, to a channel; to a further channel are transmitted, subsequent to reversal of polarity, the negative half periods of the auxiliary carrier (or the negative sampling signals) with the internal modulation $\beta R$; finally the signals of the two channels are supplied to a mixing stage in a manner such that a signal occurs which corresponds to the sum $\alpha V+\beta R$ i.e. the value of the brightness signal. Such a signal is shown by way of example in Fig. 5, wherein 4*a* designates the positive half periods with the external modulation, corresponding to the green component V and 4*b* designates the demodulated negative half periods with the internal modulation, corresponding to the red components R.

It is assumed in the foregoing that in Fig. 2 the load resistors **18*a* and 18*b*** are different. However, in the particular case in which the two demodulated video signals are superimposed in a single load resistor, the total brightness signal $\alpha V+\beta R$ is as indicated above; otherwise this superimposition is not troublesome, since one signal is zero when the other occurs. Such a signal can be supplied to a conventional image reproducing tube to reproduce a black-and-white image or any other image.

The receiver shown in block form in Fig. 6 comprises an antenna 31 connected to amplifier and mixer circuits of conventional form so that there is formed at the output thereof, i.e., at the anode of the I.F. amplifier tube 11 of Fig. 2 a modulated carrier wave of the form illustrated in Fig. 1. The amplifier 32 supplies a signal detector and separator circuit 34 such as shown in Fig. 2. Reproducing devices 35 and 36, which may be cathode ray tubes, are connected to receive the output signals of the separator circuit 34. The synchronizing signal for the scanning circuit 33 may be derived as above disclosed, i.e., from the load resistor 20 of the diode 19 of Fig. 1 or from the pentodes 30 or 25 of Figs. 3 or 4 as determined by the form of the sync pulse as above described.

What is claimed is:

1. A receiver for a carrier wave having a modulation component comprising an auxiliary wave the positive and negative half-cycle periods of which are amplitude modulated by two signals respectively, comprising two resonant circuits tuned to the frequency of said carrier wave, first and second detector means comprising two unilaterally conductive members connected to a respective inductor element of said resonant circuits, and means comprising said detectors for detecting amplitude variations of said carrier wave and for separating the respective half-cycle periods of said auxiliary wave into separate signals channels thereby to form two individual signals.

2. A receiver for a carrier wave having a modulation component comprising an auxiliary wave the positive and negative half-cycle periods of which are amplitude modulated by two signals respectively, comprising a resonant circuit tuned to the frequency of said carrier wave, said resonant circuit comprising two inductor elements connected in shunt relationship, means for detecting amplitude variations of said carrier wave and for separating the respective half-cycle periods of said auxiliary wave into separate signal channels thereby to form two individual signals, said means comprising first and second unilaterally conductive elements connected in series additive relationship to one of said inductor elements, means for applying a polarizing potential to the junction of said series connected elements, means for connecting the element more remote from the said inductor to a first signal channel, third and fourth unilaterally conducting elements connected in series opposition relationship to the other of said inductor elements, means for applying a polarizing potential to the junction of said latter series connected elements, and means for connecting said element more remote from said second inductor to a second signal channel.

3. A receiver for a carrier wave having as modulation components an auxiliary wave the positive and negative half-cycle periods of which are amplitude modulated by two signals respectively and a synchronizing pulse establishing the amplitude of the carrier wave at a given value, comprising a resonant circuit tuned to the frequency of said carrier wave, said resonant circuit comprising two inductor elements connected in shunt relationship, means for detecting amplitude variations of said carrier wave and for separating the respective half-cycle periods of said auxiliary wave into separate signal channels thereby to form two individual signals, said means comprising first and second unilaterally conductive elements connected in series additive relationship to one of said inductor elements, means for applying a polarizing potential to the junction of said series connected elements, means for connecting the element more remote from said inductor to a first signal channel, third and fourth unilaterally conducting elements connected in series opposition relationship to the other of said inductor elements, means for applying a polarizing potential to the junction of said latter series connected elements, means for connecting said element more remote from said second inductor to a second signal channel, and means connected to one of said junctions for deriving said synchronizing pulse.

4. A receiver as claimed in claim 3, wherein said synchronizing pulse deriving means comprises a unilaterally conducting element having a first terminal connected to one of said junctions, means for applying a biasing potential to said element and output circuit means connected to a second terminal of said element.

5. A receiver as claimed in claim 3, wherein said synchronizing pulse deriving means comprises an electron discharge system having an input electrode and an output electrode, means for connecting the input electrode to the junction of said unilaterally conductive elements connected in series additive relationship, and output circuit means connected to said output electrode.

6. A receiver as claimed in claim 3, wherein said synchronizing pulse deriving means comprises an electron discharge system having an input electrode and an output electrode, means for connecting the input electrode to the junction of said unilaterally conductive elements connected in series opposition relationship, and output circuit means connected to said output electrode.

References Cited in the file of this patent

UNITED STATES PATENTS

| | | |
|---|---|---|
| 1,906,269 | Hough | May 2, 1933 |
| 2,262,764 | Hull | Nov. 18, 1941 |
| 2,266,194 | Guanella | Dec. 16, 1941 |
| 2,352,634 | Hull | July 4, 1944 |
| 2,607,035 | Levine | Aug. 12, 1952 |
| 2,696,523 | Theile | Dec. 7, 1954 |